United States Patent
McLaughlin et al.

(10) Patent No.: US 12,237,754 B2
(45) Date of Patent: Feb. 25, 2025

(54) FLUID PLATE ASSEMBLY

(71) Applicant: Rolls-Royce Corporation, Indianapolis, IN (US)

(72) Inventors: Allison McLaughlin, Indianapolis, IN (US); David Burnside, Indianapolis, IN (US); Thomas Bennett, Indianapolis, IN (US); Martin Pluim, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 427 days.

(21) Appl. No.: 17/645,213

(22) Filed: Dec. 20, 2021

(65) Prior Publication Data
US 2023/0198339 A1   Jun. 22, 2023

(51) Int. Cl.
| | |
|---|---|
| H02K 9/193 | (2006.01) |
| F04B 1/0465 | (2020.01) |
| F04B 1/146 | (2020.01) |
| F04B 1/2078 | (2020.01) |
| F04B 39/02 | (2006.01) |
| F04B 45/04 | (2006.01) |
| H02K 7/18 | (2006.01) |
| H02K 9/197 | (2006.01) |

(52) U.S. Cl.
CPC .......... *H02K 9/193* (2013.01); *H02K 9/197* (2013.01); *F04B 1/0465* (2013.01); *F04B 1/146* (2013.01); *F04B 1/2078* (2013.01); *F04B 39/02* (2013.01); *F04B 39/0223* (2013.01); *F04B 39/0238* (2013.01); *F04B 39/0284* (2013.01); *F04B 45/041* (2013.01); *F04B 45/043* (2013.01); *H02K 7/18* (2013.01); *H02K 7/1807* (2013.01); *H02K 7/1815* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,234,290 | A * | 11/1980 | Lobach | F04D 1/06 415/207 |
| 11,209,023 | B2 * | 12/2021 | Duchateau | H02K 7/1823 |
| 2004/0052670 | A1 * | 3/2004 | Dong | F04C 15/0042 418/61.3 |
| 2009/0297363 | A1 * | 12/2009 | Killion | F04C 11/001 417/46 |
| 2019/0264566 | A1 * | 8/2019 | Jones | F03B 5/00 |
| 2021/0301826 | A1 * | 9/2021 | Horng | F04D 29/4293 |

* cited by examiner

*Primary Examiner* — Binh Q Tran
(74) *Attorney, Agent, or Firm* — Shumaker & Sieffert, P.A.

(57) ABSTRACT

The disclosure describes a fluid plate assembly that includes a plurality of fluid plates and one or more seals between the plurality of fluid plates. The plurality of fluid plates are coupled together to form a fluid passage. At least one fluid plate of the plurality of fluid plates includes a plurality of holes and one or more fluid channels. The plurality of holes are configured to spray pressurized fluid on at least a portion of one or more components of a rotary machine. The one or more fluid channels that form the fluid passage are configured to direct the pressurized fluid to the plurality of holes.

20 Claims, 7 Drawing Sheets

FLUID PLATE ASSEMBLY

TECHNICAL FIELD

The present disclosure generally relates to assemblies and techniques for lubricating and/or cooling components of a rotary machine.

BACKGROUND

A rotatable shaft can rotate at high speeds during operation of a rotary machine. Due to these high speeds and subsequent heat generation, components such as gear meshes and bearings, both located on the shaft for support and within the machine's cavities, require lubrication and cooling. This is provided by supplying oil to the components.

SUMMARY

The disclosure describes example assemblies and techniques for lubricating and/or cooling components of a rotary machine using a fluid plate assembly. Fluid plate assemblies described herein may be incorporated into the rotary machine and direct pressurized fluid through channels and holes in the fluid plate assembly onto components of the rotary machine, such as shafts, seals, bearings, or gears. The fluid plate assemblies may be relatively lightweight, simple, and robust compared to other devices that lubricate and/or cool components, such as oil nozzles.

In some examples, the disclosure describes a fluid plate assembly that includes a plurality of fluid plates bolted together to form a fluid passage, and one or more seals between the plurality of fluid plates. At least one fluid plate of the plurality of fluid plates includes a plurality of channels configured to direct the pressurized fluid to a plurality of holes designed to spray pressurized fluid to components.

In some examples, the disclosure describes a rotary machine that includes a housing, one or more components encased in the housing, and one or more fluid plate assemblies encased in the housing. Each fluid plate assembly includes a plurality of fluid plates bolted together to form a fluid passage. At least one fluid plate of the plurality of fluid plates includes a plurality of holes configured to spray pressurized fluid on at least a portion of the one or more components and a plurality of channels configured to direct the pressurized fluid to the plurality of holes.

In some examples, a method for forming a fluid plate assembly includes mating an inner surface of a first fluid plate and an inner surface of a second fluid plate. At least one of the inner surfaces of the first or second fluid plates includes one or more seals. At least one of the first or second fluid plates includes a plurality of holes configured to spray pressurized fluid, and at least one of the first or second fluid plates includes a plurality of channels configured to direct the pressurized fluid to the plurality of holes. The method includes coupling together the first and second fluid plates. The plurality of channels is configured form a fluid passage configured to receive the pressurized fluid.

The details of one or more examples are set forth in the accompanying drawings and the description below. Other features, objects, and advantages will be apparent from the description and drawings, and from the claims.

DETAILED DESCRIPTION

The disclosure describes example assemblies and techniques for lubricating and/or cooling components of a rotary machine using one or more fluid plate assemblies.

To provide lubrication and cooling to components of a rotary machine, the rotary machine may include spray devices configured to produce a stream of fluid lubricant and/or coolant directed toward a component. For example, a fluid stream may be ejected from a nozzle of a nozzle assembly toward a component and contact the component to lubricate and cool the component. Such fluid streams may be supplied in a manner that both adequately lubricates and/or cools the components, while accommodating other components within a housing of the rotary machine. In some instances, fluid lubricant or coolant may be difficult or costly to deliver directly to the component due to space constraints encountered in the housing of the rotary machine and weight constraints for operating in a particular environment. For example, a fluid nozzle assembly may be relatively bulky, heavy, complex, and/or limited to only supplying lubricant and/or coolant to a particular component or volume of components.

In accordance with systems and techniques of this disclosure, a rotary machine includes one or more fluid plate assemblies configured to lubricate and/or cool components of the rotary machine. A fluid plate assembly includes two or more fluid plates in which at least one of the fluid plates includes channels formed in a surface of the fluid plate. When the fluid plates are connected together and sealed, the channels form a fluid passage that directs pressurized fluid lubricant and/or coolant to holes in at least one of the fluid plates. The holes spray the pressurized fluid on at least a portion of the components of the rotary machine, such as components located in different volumes of the housing or requiring different amounts of lubrication or cooling. The holes may be sized and positioned along and relative to a plane of the fluid plate such that the pressurized fluid is delivered to a particular component at a particular flow rate and/or along a particular flow path.

In this way, rotary machines, such as electric motors, electric propulsion units, electric generators, gas turbine engines, or other machines that include gears, gearboxes, shafts, etc., that lubricate and cool components with such fluid plate assemblies may have reduced weight, size, and/or complexity compared to rotary machines that use other fluid distribution systems, such as oil ejectors. For example, fluid plate assemblies may replace multiple jet ejectors with a single fluid plate assembly configured to supply lubricant and/or coolant to multiple components in different parts of a housing of the rotary assembly, and may be cheaper to manufacture and easier to service compared to oil ejectors. Fluid plate assemblies may provide structural support to the housing of the rotary assembly, such that the housing may be thinner.

Figure 1:
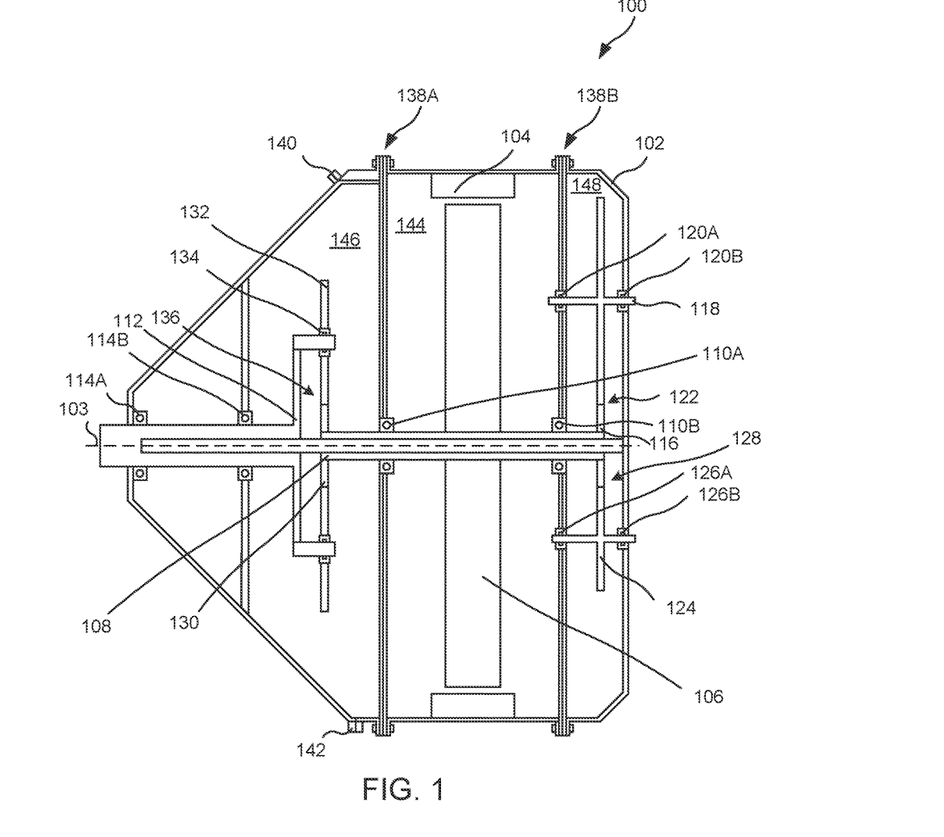
FIG. 1 is a cross-section side view diagram illustrating an example rotary machine that includes one or more fluid plate assemblies.

Fluid plate assemblies described herein may be used with a variety of rotary machines. FIG. 1 is a cross-section side view diagram illustrating an example rotary machine that includes one or more fluid plate assemblies. In the example of FIG. 1, the rotary machine is illustrated and described as an electric machine 100; however, in other examples, a rotary machine may include a gas turbine engine or other machine that includes a rotating component, such as a shaft or gear assembly.

Electric machine 100 is illustrated as an electrical propulsion unit (EPU), but may include any electric machine configured to convert electrical energy to or from rotating mechanical energy including, but not limited to, electrical generators, electrical motors, and the like. Electric machine 100 may be used in a variety of applications including, but not limited to, electrical power generation, propulsion, and the like. In some examples, electric machine 100 may be used in aircraft or watercraft applications in which space, weight, and longevity of components may be important for safety and/or efficiency, and in which opportunities for performing maintenance may be limited during operation.

Electric machine 100 includes a housing 102 defining an axis 103 along electric machine 100 and a pressurized boundary of electric machine 100. Housing 102 is configured to house components of electric machine 100 and maintain a controlled environment in which components of electric machine 100 operate, including collecting fluid used for lubrication and cooling. Electric machine 100 includes one or more shafts positioned along or parallel to an axis, such as axis 103. In the example of FIG. 1, electric machine 100 includes a motor shaft 108 and an output shaft 112; however, in other examples, electric machine 100 may include only a single shaft or more than two shafts. Housing 102 includes one or more shaft openings through which output shaft 108 may protrude from housing 102 and couple to a rotary mechanical device, such as a turbine (e.g., in examples in which electric machine 100 includes a generator) or fan (e.g., in examples in which electric machine 100 includes a motor). Electric machine 100 includes a stator 104 coupled to housing 102 and a rotor 106 coupled to motor shaft 108. In examples in which electric machine 100 includes an electric motor, stator 104 may be configured to produce a dynamic magnetic field that induces a magnetic field in rotor 106, generating torque on motor shaft 108.

Electric machine 100 includes one or more components that directly or indirectly interface with shafts 108 and/or 112 and require lubrication and/or cooling. In some examples, electric machine 100 may include stationary components that generate heat during torque generation. For example, stator 104 may produce large amounts of heat due to switching of coils of stator 104.

In some examples, electric machine 100 includes dynamic components that directly interface with other dynamic components and produce friction during rotation. In the example of FIG. 1, electric machine 100 includes various gears and gear assemblies configured to transmit power from motor shaft 108 to other components or systems. Motor shaft 108 includes a main gear 116 configured to power accessory systems and a sun gear 130 configured to power output shaft 112 and associated propulsion components. Main gear 116 may be mechanically coupled to a governor gear assembly 118 at a governor gear interface 122 and configured to rotate governor gear assembly 118 to power a governor (not shown). Main gear 116 may also be mechanically coupled to a pump gear assembly 124 at a pump gear interface 128 and configured to rotate pump gear assembly 124 to power a pump (not shown). Sun gear 130 may be mechanically coupled to a planetary gear assembly 132 at a planetary gear interface 136 and configured to power output shaft 112. Each of the gears 116 and 130, gear assemblies 118, 124, and 132, and gear interfaces 122, 128, and 136, may require lubrication to reduce wear between gears and gear assemblies.

In some examples, electric machine 100 includes components configured to support other components and generate heat or friction during torque generation. In the example of FIG. 1, electric machine 100 includes various bearings configured to support a shaft by contacting the shaft and permitting rotation of the shaft around an axis. Electric machine 100 includes a first output shaft bearing 130A and a second output shaft bearing 130B (collectively "output shaft bearings 130") coupled to housing 102. Electric machine 100 includes forward (e.g., drive end) and aft (e.g., non-drive end) motor shaft bearings 110A and 110B (collectively, "motor shaft bearings 110") configured to support motor shaft 108; forward and aft output shaft bearings 114A and 114B (collectively "output shaft bearings 114") configured to support output shaft 112; forward and aft governor gear bearings 120A and 120B (collectively "governor gear bearings 120") configured to support governor gear assembly 118; forward and aft pump gear bearings 126A and 126B (collectively "governor gear bearings 126") configured to support pump gear assembly 124; and planetary gear bearings 134 configured to support each planetary gear assembly 132. Electric machine 100 may include a variety of bearings including, but not limited to, deep groove ball bearings, angular contact ball bearings, roller bearings, hybrid bearings, and the like. Each of bearings 110, 114, 120, 126, and 134, may require lubrication to reduce wear between the respective bearings and the respective shaft or within the respective bearings.

To provide lubrication and/or cooling to the various components within housing 102, such as stator 104, gears 116, 130, gear assemblies 118, 124, 132, gear interfaces 122, 128, 136, and/or bearings 110, 114, 120, 126, and 134, electric machine 100 includes one or more fluid plate assemblies encased in housing 102. In the example of FIG. 1, electric machine 100 includes a forward fluid plate assembly 138A and an aft fluid plate assembly 138B (individually "fluid plate assembly 138" and collectively "fluid plate assemblies 138"); however, other example rotary machines may include more or fewer fluid plate assemblies 138.

Each fluid plate assembly 138 may at least partially define one or more cavities within a volume of housing 102. For example, fluid plate assembly 138A may define a forward end of a stator cavity 144 configured to house stator 104 and an aft end of propulsion cavity 146 configured to house components of propulsion drive systems, while aft fluid plate assembly 138B may define an aft end of stator cavity 144 and a forward end of an accessory cavity 148 configured house components of accessory drive systems. In other examples, fluid plate assemblies 138 may be positioned along walls of housing 102 or parallel to an axis of electric machine 100. In some examples, fluid plate assemblies 138 may function as structural components that provide rigidity and/or compressive or tensile strength to housing 102. For example, fluid plate assemblies 138 may be bolted to housing 102, oriented across electric machine 100, and support one or more walls of housing 102. As a result, walls of housing 102 may be relatively thin compared to walls of a housing of a rotary machine that does not include fluid plate assemblies that support the housing.

Each fluid plate assembly 138 is configured to supply fluid lubricant and/or coolant to one or more components within housing 102. The fluid lubricant and/or coolant may include any lubricant or coolant that is configured to flow during operation of electric machine 100. In some examples, the fluid lubricant and/or coolant may be configured to function primarily as a liquid lubricant and selected for various lubrication properties, such as high boiling point, low freezing point, high viscosity, high corrosion or oxidation resistance, and the like. In some examples, the fluid lubricant and/or coolant may be configured to function primarily as a liquid coolant and selected for various thermal properties, such as high heat capacity, high thermal conductivity, high boiling point, low freezing point, dielectric properties, and the like. In some examples, the fluid lubricant and/or coolant may be configured to function as both a lubricant and a coolant. For ease of description, the fluid lubricant and/or coolant will be described herein as a "fluid," and may include oils; however, lubricants or coolants that are not oil-based may be used. For example, the lubricant and/or coolant may include aliphatic hydrocarbons.

In the example of FIG. 1, forward fluid plate assembly 138A is configured to deliver fluid to components within stator cavity 144 and propulsion cavity 146, while aft fluid plate assembly 138B is configured to deliver fluid to components within stator cavity 144 and accessory cavity 148. Components within stator cavity 144 may include components configured to generate or support torque on shaft 108, such as stator 104 and portions of motor shaft bearings 110; components within propulsion cavity 146 include components configured to generate or support propulsion systems, such as output shaft bearings 114, sun gear 130, planetary gear assembly 132, planetary gear bearings 134, and planetary gear interface 136; and components within accessory gear cavity 148 may include components configured to generate or support accessory systems, such as portions of motor shaft bearings 110, main gear 116, governor gear assembly 118, governor gear bearings 120, governor gear interface 122, pump gear assembly 124, pump gear bearings 126, and pump gear interface 128.

In the example of FIG. 1, electric machine 100 includes a fluid inlet 140 configured to receive fluid from a fluid system (not shown) for delivery to fluid plate assemblies 138 and a fluid outlet 142 configured to discharge fluid from within housing 102 to the fluid system. The fluid system may be configured to supply fluid to electric machine 100, cool the fluid from electric machine 100, and filter the fluid from electric machine 100, and may include components, such as a pump, a heat exchanger, and/or a filter, configured to provide the supply, cooling, and filtration functions. In some examples, the pump may be powered by electric machine 100, such as via pump gear assembly 124.

The fluid system may supply the pressurized fluid to electric machine 100. For example, the fluid system may control a pressure, temperature, and/or flow rate of fluid to electric machine 100 to adequately lubricate and/or cool components of electric machine 100. In some examples, the fluid system may control (e.g., increase, decrease, or maintain) a pressure within the fluid passage of fluid plate assemblies 138 and/or a flow rate of fluid to fluid plate assemblies 138 based on at least one of a temperature of the one or more components (e.g., a temperature of stator 104 or bearings 110, 114, 120, 126), a rotational speed of one or more components of electric machine 100 (e.g., shafts 108, 112 or gear assemblies 118, 124, 132, or an overall power level of electric machine 100), or any other indication of an extent to which lubrication and/or cooling may be required or beneficial.

Each fluid plate assembly 138 includes a plurality of fluid plates coupled together, such as using bolts, to form a fluid passage between and/or within the fluid plates from fluid channels within the fluid plates. The fluid passage may be configured to receive pressurized fluid from outside electric machine 100, such as through fluid inlet 140, and distribute fluid within fluid plate assembly 138. One or more seals may be positioned between the plurality of fluid plates to define a pressurized boundary of the fluid passage.

Each fluid plate assembly 138 includes a plurality of holes configured to spray pressurized fluid on at least a portion of the components within housing 102. The holes may extend through at least one fluid plate of fluid plate assembly 138 between a relatively higher pressure within the fluid passage and a relatively lower pressure within one of cavities 144, 146, 148. Each fluid plate assembly 138 includes one or more fluid channels configured to direct the pressurized fluid from fluid inlet 140 to the plurality of holes. One or more openings in housing 102 (not labeled) may be fluidically coupled to fluid outlet 142 and configured to direct used fluid to fluid outlet 142 for return to the fluid system.

Each of the components within housing 102 may have various lubrication and/or cooling requirements, and may be at different positions within housing 102 relative to fluid plate assemblies 138. The plurality of channels and the plurality of holes of fluid plate assemblies 138 may be configured to direct the fluid to particular components or volumes of components at particular flow rates to provide adequate lubrication and/or cooling to the various components. For example, the plurality of channels may have various properties, such as width and depth, and the plurality of holes may have various properties, such as shape, size (e.g., diameter, area, etc.), length, areal concentration (e.g., number of holes in an area, number of holes directed at a component, etc.), angle, and/or planar position (e.g., position of holes on fluid plate), that produce one or more fluid streams that deliver fluid to the various components to sufficiently lubricate and/or cool the components, as will be described further in FIGS. 2A-2C, FIGS. 3A-3B, and FIGS. 4A-4D.

In operation, fluid inlet 140 may receive pressurized fluid discharged from the fluid system and direct the fluid through one or more inlet channels into fluid plate assemblies 138. The pressurized fluid may travel through one or more fluid channels of each fluid plate assembly 138 and discharge from the plurality of holes as fluid streams. The fluid streams may lubricate and cool the various components based on the pressure of the pressurized fluid and the various properties of the plurality of channels and the plurality of holes. Fluid from the fluid streams may contact the components and flow to housing 102. Fluid outlet 142 receives the spent fluid through one or more outlet channels and discharges the spent fluid back to the fluid system for cooling and filtration. In this way, components within housing 102 may be lubricated and/or cooled efficiently, simply, and with lower weight compared to electric machines that do not include fluid plate assemblies.

Figure 2A:
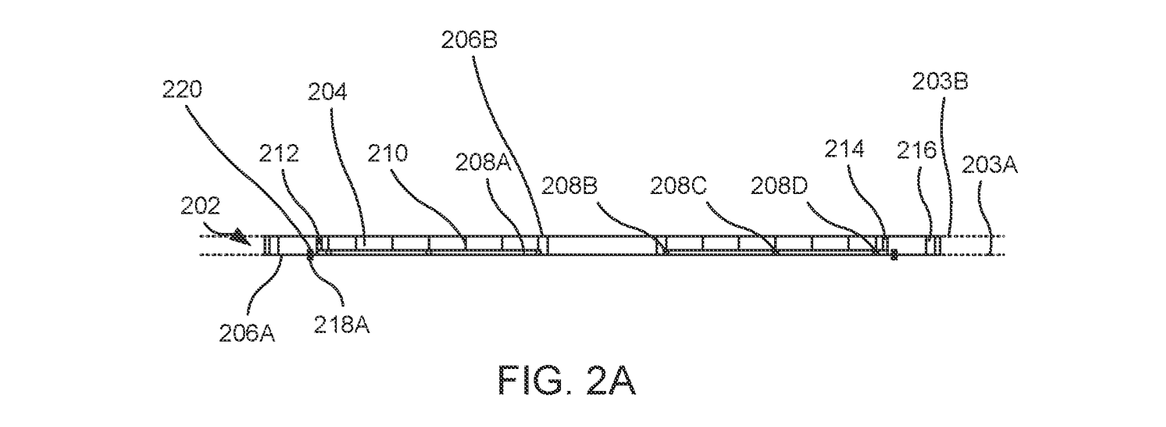
FIG. 2A is a cross-section side view diagram illustrating an example fluid plate of a fluid plate assembly.

Fluid plate assemblies described herein are formed from a plurality of fluid plates. FIG. 2A is a cross-section side view diagram illustrating an example fluid plate 202 of a fluid plate assembly. Fluid plate 202 is substantially planar and configured to be positioned within a housing of a rotary machine, such as housing 102 of electric machine 100 of FIG. 1, such that a plane of fluid plate 202 is substantially perpendicular to the axis of the rotary machine. In other examples, fluid plate 202 may have other configurations, such as a parallel orientation relative to the axis of the rotary machine.

Fluid plate 202 includes a substrate 204 having an inner surface 206A in along an inner plane 203A and an outer surface 206B along an outer plane 203B. Inner surface 206A may be configured to mate with a substantially planar surface, such as an inner surface of another fluid plate or a wall of a housing, while outer surface 206B may be configured to face a cavity of a rotary machine. A variety of materials may be used for substrate 204 including, but not limited to, metals, alloys, composites, and the like.

Figure 2B:
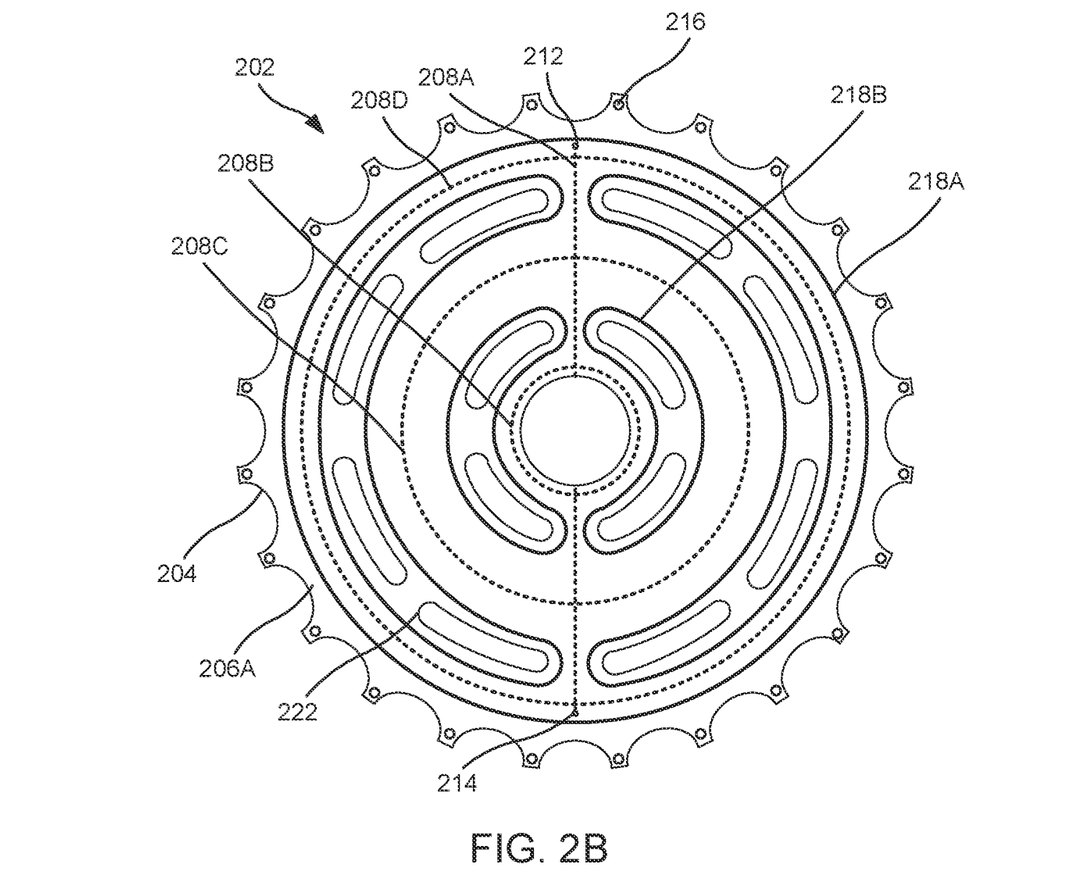
FIG. 2B is a front view diagram illustrating the example fluid plate of FIG. 2A.
Figure 2C:
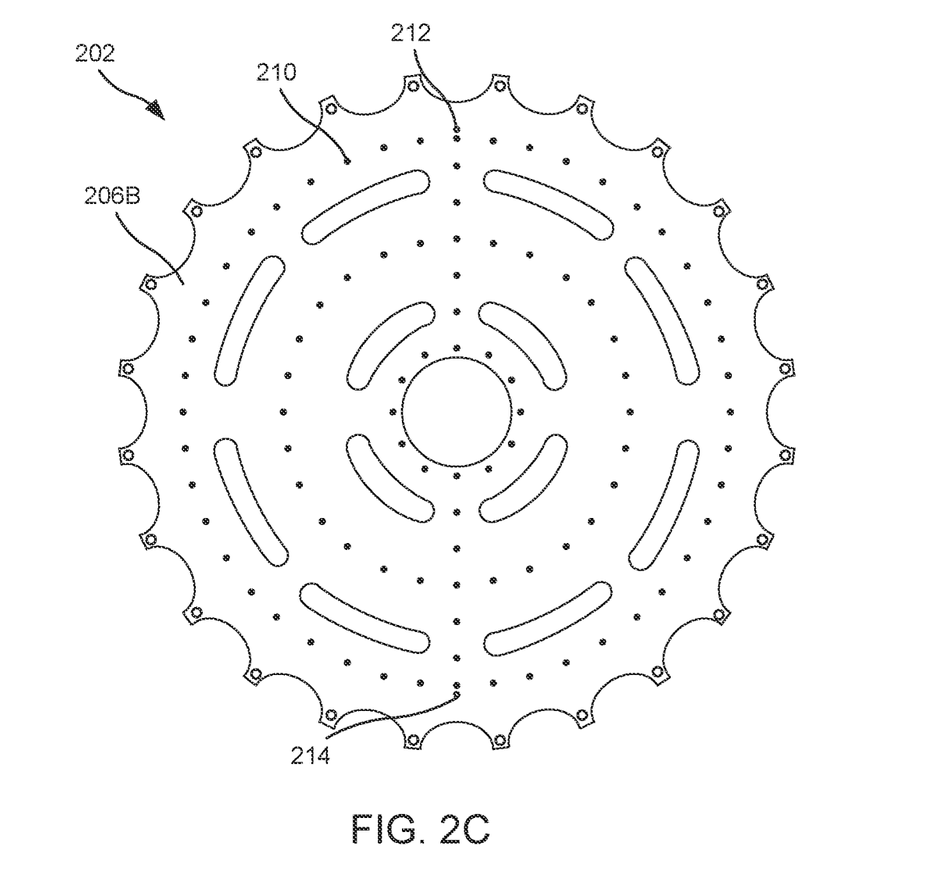
FIG. 2C is an aft view diagram illustrating the example fluid plate of FIG. 2A.

In some examples, such as illustrated in FIGS. 2B and 2C, substrate 204 includes one or more cutouts 222. Cutouts 222 may be configured to reduce a weight of fluid plate 202 by removing material from substrate 204 while still providing substantial support along fluid plate 202. In the example of FIGS. 2B and 2C, two circular rows of cutouts are formed. In some examples, at least 10% of a surface area of fluid plate 202 includes cutouts 222. In some examples, cutouts 222 may be configured to accommodate and/or support various components. For example, cutouts 222 may be configured to couple to bearings that support a gear assembly or other rotating component or provide an opening to extend a shaft or other projection.

Fluid plate 202 includes one or more inlets 212 configured to receive pressurized fluid from a fluid inlet, such as fluid inlet 140 of FIG. 1. Fluid plate 202 may include one or more outlets 214 configured to discharge excess pressurized fluid to a fluid outlet 142. For example, fluid that is not delivered through the plurality of holes 210 may be discharged from fluid plate 202. While shown as extending through fluid plate 202 in an orientation perpendicular to planes 203 of fluid plate 202, in other examples, inlet 212 and/or outlet 214 may extend through a side of fluid plate 202 parallel to planes 203 of fluid plate 202.

Fluid plate 202 includes a plurality of channels formed into inner surface 206A that run parallel to inner plane 203A of fluid plate 202. The plurality of channels includes a plurality of fluid channels 208A, 208B, 208C, 208D (individually "fluid channel 208" and collectively "fluid channels 208") and a plurality of seal channels 220 (individually "seal channel 220" and collectively "seal channels 220"). Each fluid channel 208 is configured to direct fluid to a plurality of holes 210, while each seal channel 220 is configured to receive one or more seals. At least a portion of the plurality of fluid channels 208 are configured to receive fluid from inlet 212.

FIG. 2B is a front view diagram illustrating the example fluid plate of FIG. 2A. In the example of FIG. 2B, the plurality of fluid channels 208 includes a radial fluid channel 208A, an inner circumferential fluid channel 208B, an intermediate circumferential fluid channel 208C, and an outer circumferential fluid channel 208D. Radial fluid channel 208A may be configured to distribute fluid from inlet 212 in a radial direction toward circumferential fluid channels 208B, 208C, and 208D. Circumferential fluid channels 208B, 208C, 208D, may be configured to distribute fluid in a circumferential direction around the axis of fluid plate 202. While fluid channels 208 are illustrated in FIG. 2B as having differentiated directional components, in other examples, fluid channels 208 may include any directional components along inner plane 203A of fluid plate 202, such as spiral directions having both circumferential and radial components. Fluid channels 208 may be sized, such as with a depth perpendicular to inner plane 203A and width along inner plane 203A, to flow fluid within fluid channels 208. In some examples, fluid channels 208 may have a depth or width to produce a relatively low pressure drop during operation.

The plurality of fluid channels 208 forms a distribution network through which pressurized fluid may flow to different locations within inner plane 203A of fluid plate 202. In some examples, fluid channels 208 are interconnected to form a single fluid passage when positioned against another fluid plate. In some examples, fluid channels 208 may form two or more fluid passages, each fluid passage supplied by a different inlet 212 and discharging to a different outlet 214.

In the example of FIG. 2B, fluid plate 202 includes one or more seals 218 positioned in the plurality of seal channels 220. Seals 218 are configured to substantially seal one or more fluid passages formed by the plurality of fluid channels 208 for fluid pressures experienced during operation of the rotary machine. For example, seals 218 may substantially prevent fluid from discharging from ends of fluid plate 202 or at cutouts 222 of fluid plate 202, such that fluid received by inlet 212 may discharge from the plurality of holes 210 and outlet 214.

Fluid plate 202 includes plurality of holes 210 configured to spray pressurized fluid on at least a portion of one or more components of a rotary machine. Holes of the plurality of holes 210 are positioned at various locations along an outer plane 205 of fluid plate 202. The plurality of fluid channels 208 are configured to distribute the fluid to various holes of the plurality of holes 210.

FIG. 2C is an aft view diagram illustrating the example fluid plate 202 of FIG. 2A. The plurality of holes 210 are distributed at various locations along outer plane 203B of fluid plate 202 and correspond to (e.g., are fluidically coupled to) the plurality of fluid channels 208. While the plurality of holes 210 is symmetrically distributed, the plurality of holes 210 may have any distribution, including irregular and asymmetric distribution. Further details of the plurality of holes 210 will be described in FIGS. 4A and 4B below.

Figure 3A:
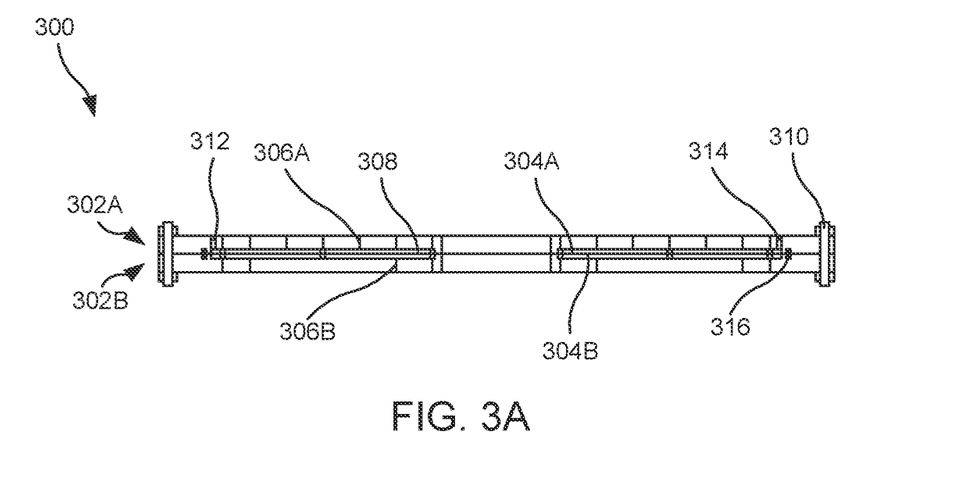
FIG. 3A is a cross-section side view diagram illustrating an example fluid plate assembly.

Fluid plate assemblies described herein may include a plurality of fluid plates, including one or more fluid plates as described in FIGS. 2A-2C. FIG. 3A is a cross-section side view diagram illustrating an example fluid plate assembly 300. In the example of FIG. 3A, fluid plate assembly 300 includes a first fluid plate 302A and a second fluid plate 302B (individually "fluid plate 302" and collectively "fluid plates 302"); however, in other examples, fluid plate assembly 300 may include more than two fluid plates 302. Fluid plates 302 may be arranged by mating an inner surface of one fluid plate 302, such as first fluid plate 302A, with an inner surface of another fluid plate 302, such as second fluid plate 302B. An outer surface 316A of first fluid plate 302A is configured to face a first set of components, while an outer surface 316B of second fluid plate 302B is configured to face a second set of components.

Fluid plates 302A and 302B are coupled together to form a fluid passage 308. For example, fluid plate assembly 300 may include one or more bolts 310 configured to extend through fluid plates 302 and couple together fluid plates 302, such as alone or to a housing of a rotary machine. First fluid plate 302A includes a first plurality of fluid channels 304A and second fluid plate 302B includes a second plurality of fluid channels 304B. When coupled together, the first and second pluralities of fluid channels 304A and 304B form fluid passage 308. Fluid passage 308 may be fluidically coupled to an inlet 312 and an outlet 314, such that fluid passage 308 may receive pressurized fluid though inlet 312 from a fluid system and discharge spent fluid through outlet 314 back to the fluid system.

Fluid plate assembly 300 may be configured to spray fluid to a first set of components from outer surface 316A of first fluid plate 302A and spray fluid to a second set of components from outer surface 316B of second fluid plate 302B. In some examples, such as illustrated in FIG. 3A, fluid plate assembly 300 may be configured to spray fluid differently from outer surface 316A and outer surface 316B. For example, the first set of components exposed to outer surface 316A may have a different spatial distribution and different fluid requirements as the second set of components exposed to outer surface 316B. As such, first fluid plate 302A may have a first plurality of holes 306A configured to deliver fluid to the first plurality of components, while second fluid plate 302B may have a second plurality of holes 306B configured to deliver fluid to the second plurality of components. For example, the first plurality of holes 306A may be configured to spray components of a gear box or other components having a relatively wide spatial distribution. In contrast, the second plurality of holes 306B may be configured to spray components of a motor, such as a stator and motor bearing, having a relatively focal spatial distribution.

Figure 3B:
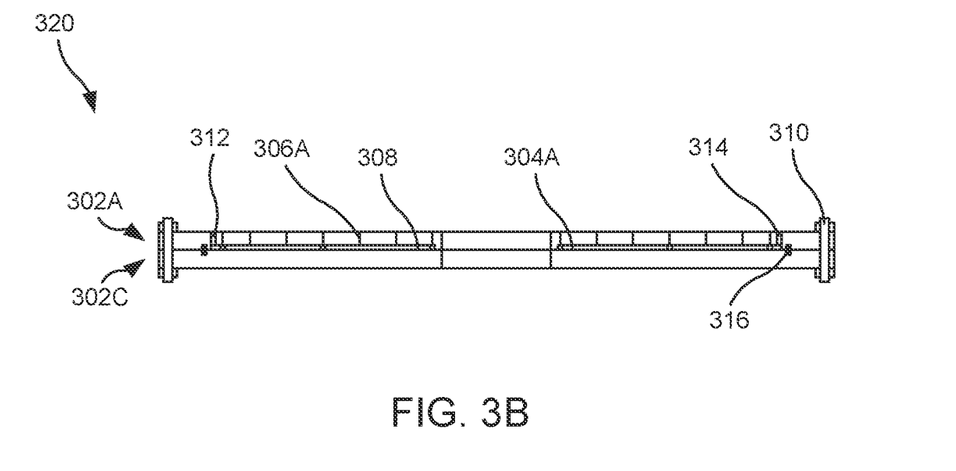
FIG. 3B is a cross-section side view diagram illustrating an example fluid plate assembly.

While fluid plate assembly 300 of FIG. 3A includes two fluid plates having a plurality of fluid channels and a plurality of holes 306, in some examples, a fluid plate assembly may only include one fluid plate having one or more fluid channels and a plurality of holes. FIG. 3B is a cross-section side view diagram illustrating an example fluid plate assembly 320. In the example of FIG. 3B, fluid plate 302A and fluid plate 302C are coupled together. Fluid plate 302C does not include a plurality of fluid channels or a plurality of holes; rather, an inner surface of fluid plate 302C provides a boundary of fluid passage 308, includes one or more seal channels, and supports fluid plate 302A. For example, fluid plate 302C may primarily provide support to fluid plate assembly 320, while fluid plate 302A may provide a fluid distribution function of fluid plate assembly 320.

Figure 4A:
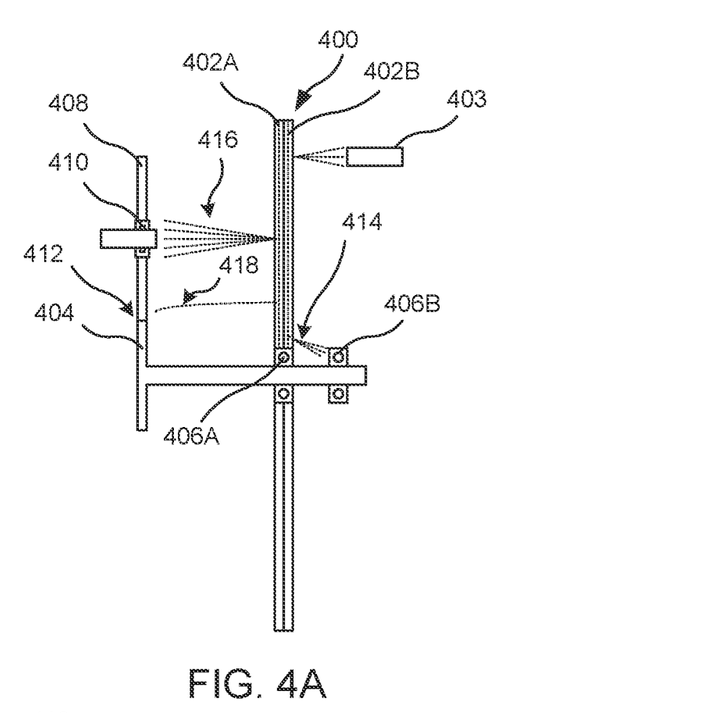
FIG. 4A is a cross-section side view diagram illustrating an example fluid spray distribution from an example fluid plate assembly.

Fluid plate assemblies described herein may be configured to deliver fluid to components having a variety of lubrication and/or cooling requirements and spatial configurations. To deliver fluid to these various components, fluid plate assemblies may be configured to deliver fluid according to one or more spray distributions. FIG. 4A is a cross-section side view diagram illustrating an example fluid spray distribution from an example fluid plate assembly 400. For purposes of illustration, fluid plate assembly 400 is configured to deliver fluid to a stator 403, sun gear assembly 404, fore and aft sun gear bearings 406A and 406B, planet gear assembly 408, planet gear bearings 410, and planet gear interface 412. Fluid plate assembly 400 includes a first fluid plate 402A and a second fluid plate 402B. First fluid plate 402A has an outer surface configured to face a first direction and spray pressurized fluid from a first plurality of holes to a first set of components. Second fluid plate 402B has an outer surface configured to face a second direction, opposite the first direction, and spray pressurized fluid from a second plurality of holes to a second set of components.

Each of first and second fluid plates 402 may deliver pressurized fluid as a spray distribution. A spray distribution may include a spatial distribution (origin of fluid along plane, direction of fluid from plane, and distance of target of fluid from plane) and flow rate of fluid streams produced by the respective plurality of holes. The spray distribution of a particular fluid plate 402 may be configured based on a spatial distribution of a set of components lubricated and/or cooled by the respective fluid plate 402 and lubrication and/or cooling requirements of the set of components. For example, a particular component may be located at a particular position within a housing of the rotary machine and use a particular amount of fluid for lubrication and/or cooling. At least a portion of holes may be configured to supply one or more fluid streams to the particular component. To produce the one or more fluid streams, the holes corresponding to the particular component may be oriented to direct fluid to the particular component at a sufficient flow rate to lubricate and/or cool the component.

Figure 4B:
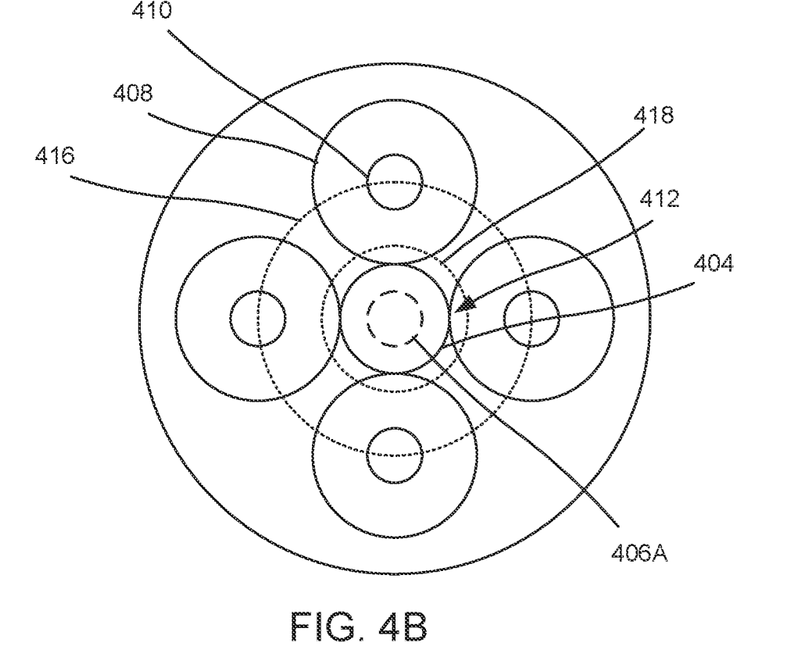
FIG. 4B is a front view diagram illustrating the example fluid spray distribution of a first fluid plate from the example fluid plate assembly of FIG. 4A.

First fluid plate 402A includes a plurality of holes configured to deliver pressurized fluid in a first spray distribution. FIG. 4B is a front view diagram illustrating the example fluid spray distribution of first fluid plate 402A from the example fluid plate assembly 400 of FIG. 4A. As shown in FIG. 4B, first fluid plate 402A includes a first spatial distribution of holes in the outer surface of first fluid plate 402A, such that the plurality of holes deliver a fluid stream 416 to planet gear bearings 410 and a fluid stream 418 to planet gear interface 412. Each of the plurality of holes has a position within a plane of first fluid plate 402A and an orientation with respect to an angle from the plane of first fluid plate 402A to direct fluid stream 416 to planet gear bearings 410 and fluid stream 418 to planet gear interface. The plurality of holes may also direct fluid stream 416 to planet gear bearings according to a first flow rate sufficient to lubricate and/or cool planet gear bearing 410 and direct fluid stream 418 to planet gear interface 412 at a second flow rate sufficient to lubricate and/or cool planet gear interface 412.

Figure 4C:
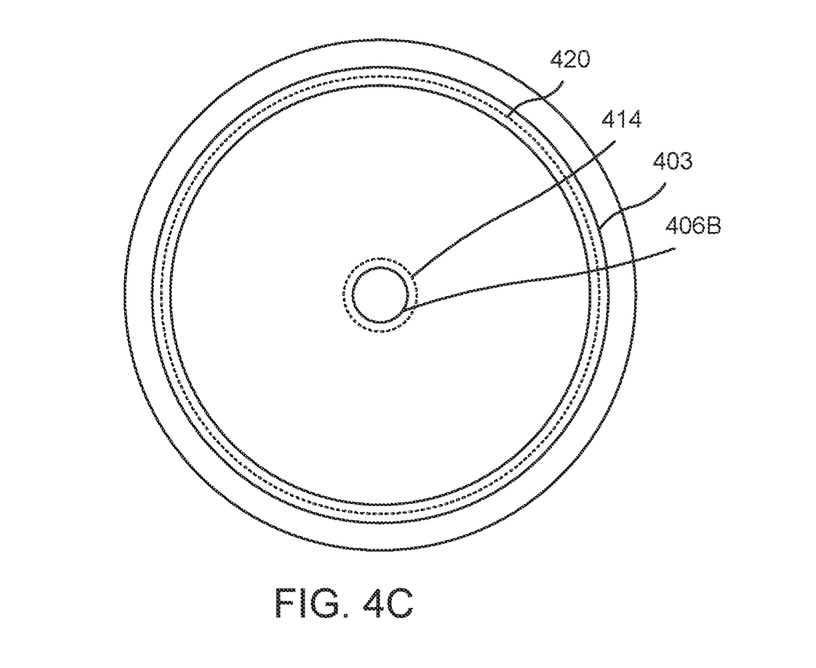
FIG. 4C is a front view diagram illustrating the example fluid spray distribution of a second fluid plate from the example fluid plate assembly of FIG. 4A.

Second fluid plate 402B includes a plurality of holes configured to deliver pressurized fluid in a second spray distribution, different from the first spray distribution. FIG. 4C is a front view diagram illustrating the example fluid spray distribution of second fluid plate 402B from the example fluid plate assembly 400 of FIG. 4A. As shown in FIG. 4C, second fluid plate 402B includes a second spatial distribution of holes in the outer surface of second fluid plate 402B, such that the plurality of holes deliver a fluid stream 414 to aft sun gear bearings 406B and a fluid stream 420 to stator 403. Each of the plurality of holes has a position within a plane of second fluid plate 402B and an orientation with respect to an angle from the plane of first fluid plate 402A to direct fluid stream 414 to aft sun gear bearings 406B and fluid stream 420 to stator 403. The plurality of holes may also direct fluid stream 414 to aft sun gear bearings according to a first flow rate sufficient to lubricate and/or cool planet gear bearing 410 and direct fluid stream 418 to planet gear interface 412 at a second flow rate sufficient to lubricate and/or cool planet gear interface 412.

Referring back to FIG. 4A, in addition to spraying fluid to one or more components, fluid plate assembly 400 may be configured to deliver fluid directly to one or more components. In the example of FIG. 4A, fore sun gear bearing 406A may be adjacent to fluid plates 402A and 402B, such that either first fluid plate 402A or second fluid plate 402B may directly deliver fluid to fore sun gear bearing 406A, such as through one or more holes parallel to, rather than perpendicular to, a plane of first or second fluid plate 402.

Figure 4D:
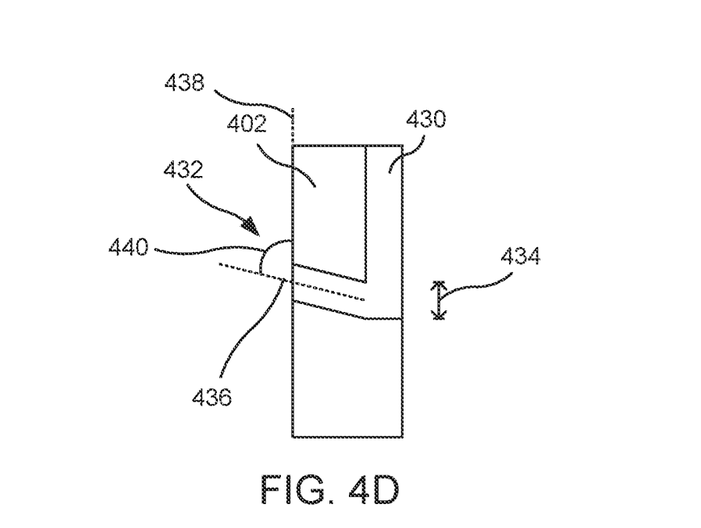
FIG. 4D is a cross-section side view diagram illustrating an example hole of an example fluid plate.

The spray distribution produced by a particular fluid plate 402 may be a function of various collective and individual properties of the holes in the particular fluid plate 402, including a spatial distribution of holes in fluid plate 402, an orientation of the holes in fluid plate 402, a size of holes in fluid plate 402, a shape of holes in fluid plate 402, and the like. FIG. 4D is a cross-section side view diagram illustrating an example 422 hole of an example fluid plate 402. Hole 422 forms an axis 426 at an angle 430 with a plane of an inner surface of the at least one fluid plate that is less than about 90 degrees. Hole 422 also has a diameter 434 that defines an area.

In some examples, one or more holes of fluid plates 402 may be configured to deliver fluid in a fluid stream at an angle from a plane of fluid plate 402. For example, fluid plate 402 may include at least some holes oriented at angle 430 less than about 90 degrees. One or more surfaces of a component requiring lubrication may be behind another component, such that to deliver fluid to the component, at least some of the holes may be angled to define a direction of the corresponding fluid stream.

In some examples, one or more holes of fluid plates 402 may be configured to deliver fluid in a fluid stream that has a particular shape or spread. For example, to provide a fluid stream to a component having a particular size and distance from fluid plate 402, a shape and/or length of one or more holes may be configured to develop the fluid stream, such that the fluid stream has a particular shape or spread once the fluid stream contacts the component. In some examples, a thickness of bump-outs at the holes may be increased or decreased to change a length of the particular hole.

In some examples, two or more holes of fluid plates 402 may be configured to deliver fluid at different flow rates. For example, fluid plate 402 may include a first hole or set of holes having a first diameter 434 defining a first area and a second hole or set of holes having a second, larger diameter 434 defining a second, larger area. As a result, the first hole or set of holes may have a lower flow rate for the same pressure differential across fluid plate 402 compared to the second hole or set of holes.

In some examples, two or more holes of fluid plates 402 may be configured to deliver fluid in different spray shapes. For example, fluid plate 402 may include a first hole or set of holes having a first shape defining a first spray divergence and a second hole or set of holes having a second shape defining a second, larger divergence. As a result, the first hole or set of holes may be configured to form a narrower fluid stream at a particular distance from fluid plate 402 for the same pressure differential across fluid plate 402 compared to the second hole or set of holes.

In some examples, fluid plate 402 may be configured to deliver different flow rates of fluid to different components. For example, fluid plate 402 may include a first set of holes having a first quantity and/or first surface area producing a first collective flow rate and a second set of holes having second, higher quantity and/or second, higher surface area producing a second, higher collective flow rate. The first set of holes may be directed at a first component having a lower lubrication and/or cooling load and the second set of holes may be directed at a second component having a higher lubrication and/or cooling load.

Figure 5:
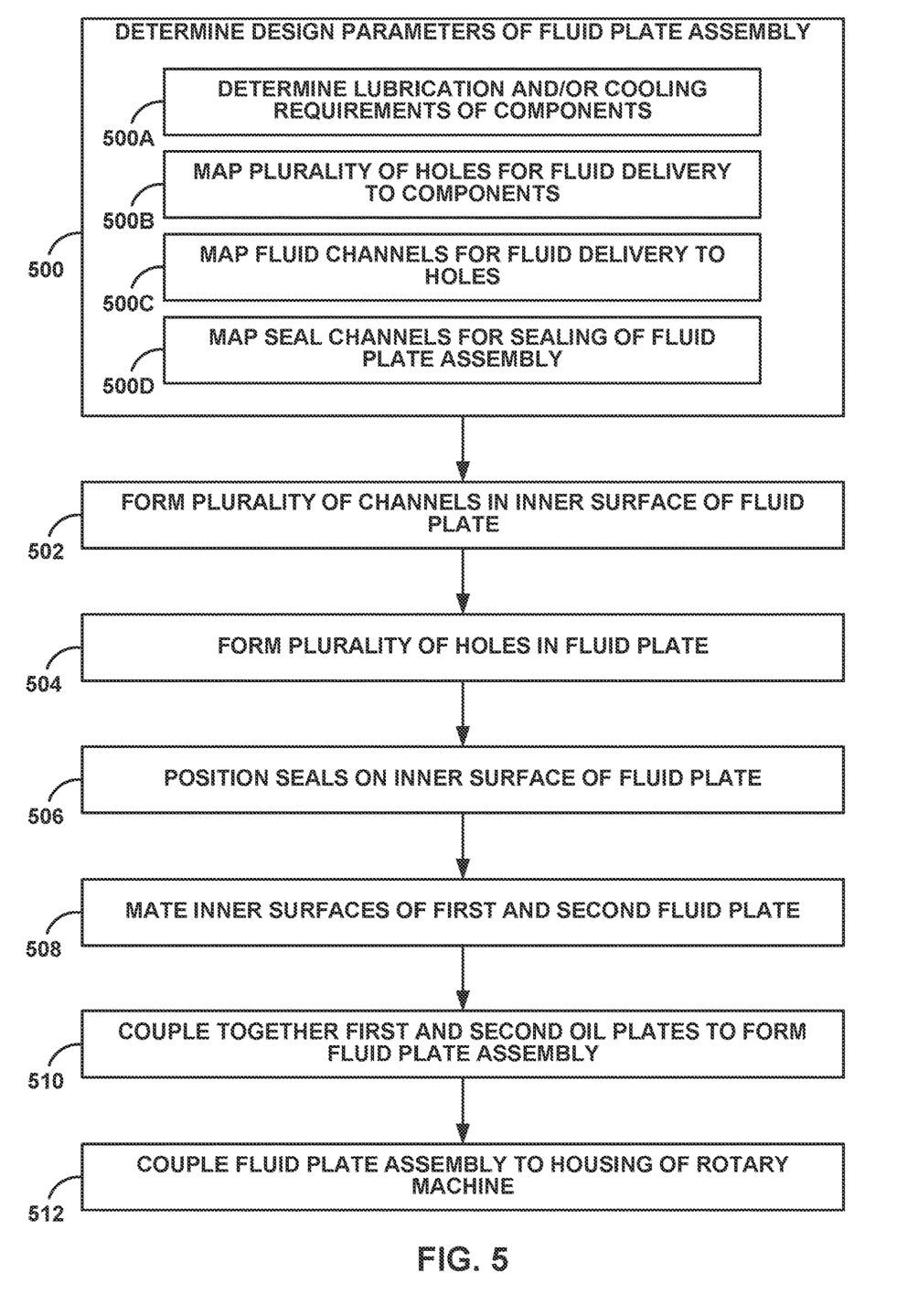
FIG. 5 is a flowchart of an example method for assembling an example fluid plate assembly.

FIG. 5 is a flowchart of an example method for forming an example fluid plate assembly. The method of FIG. 5 will be described with reference to fluid plate 202 of FIG. 2A for steps 500, 502, 504, and 506, fluid plate assembly 300 of FIG. 3A for steps 500, 508 and 510, and electric machine 100 of FIG. 1 for step 512; however, the method of FIG. 5 may be used to form other fluid plate assemblies using other fluid plates in other rotary machines.

Fluid plate assemblies described herein may be customized for particular applications. Prior to forming the fluid plate assemblies, the method of FIG. 5 includes determining design parameters for fluid plate assembly 300 (500). For example, a design engineer may determine lubrication and/or cooling requirements of various components of an electric machine (500A), such as electric machine 100 of FIG. 1. Such lubrication and/or cooling requirements may include which components may require lubrication and/or cooling and an amount of lubrication and/or cooling provided to the selected components.

For each fluid plate of fluid plate assembly, the method may include mapping a plurality of holes 210 to fluid plate 202 for fluid delivery to the components (500B). For example, for each component, the design engineer may determine a relative distance to the desired position of fluid plate 202 within the electric machine, a relative height (y-axis) and relative offset (x-axis) to the desired position of fluid plate 202, and a size of the component or portion of the component requiring lubrication and/or cooling. For each component, the design engineer may determine various parameters of one or more holes 210 to provide a fluid stream that provides fluid to the component at a desired flow rate. For example, for each component, the design engineer may determine directionality of one or more fluid streams by determining a position of one or more holes 210 in a plane of fluid plate 202, an angle of one or more holes 210 from the plane of fluid plate 202, and a shape of one or more holes 210, such that the fluid stream is directed to the component and provides a sufficiently developed fluid spray to contact the component or portion of the component requiring cooling. For each component, the design engineer may determine fluid flow of one or more fluid streams by determining a size of one or more holes 210 of fluid plate 202 and a number of holes of fluid plate 202.

For each fluid plate of a fluid plate assembly, the method may include mapping one or more fluid channels 208 for fluid delivery to the plurality of holes 210 (500C). For example, for each component, the design engineer may determine a number and location of fluid channels 208 along an inner surface of fluid plate 202 to deliver fluid to the plurality of holes 210 and a size of fluid channels 208 to provide a sufficient flow rate of fluid to the plurality of holes 210 at a desired fluid pressure.

For each fluid plate of a fluid plate assembly, the method may include mapping one or more seal channels 220 to seal the fluid plate assembly (500D). For example, the design engineer may determine a location of seal channels 220 for fluid plate 202, such that fluid channels form a sealed fluid passage between fluid inlet 212, fluid outlet 214, and the plurality of holes 210.

Step 500 may be performed using any of steps 500A-500D in any particular order. For example, in some instances, the plurality of fluid channels 208 may have a relatively standard configuration (e.g., a predetermined position on fluid plate 202), such that the plurality of holes 210 may be mapped based on a location of fluid channels 208. Further, while various steps 500A-500D have been described as being performed by a design engineer, in other examples, such steps may be carried out partially or completely by a computing device or an engineer of another specialty.

The method of FIG. 5 includes forming a plurality of channels 208 and 220 in an inner surface 206A of at least one fluid plate 202 (502). At least a portion of the plurality of channels 208, 220 includes the plurality of fluid channels 208. Any of a variety of manufacturing techniques may be used to form the plurality of channels including, but not limited to, subtractive manufacturing from a substrate, additive manufacturing to form the fluid plate with the plurality of channels, and the like. In some examples, forming the plurality of channels further including machining the plurality of channels 208 in the inner surface of fluid plate 202. For example, substrate 204 prior to machining may include a relatively flat plate, and the plurality of fluid channels 208 and/or seal channels 220 may be machined based on an anticipated spray distribution for fluid plate 202. At least a portion of the plurality of channels includes a plurality of fluid channels.

The method of FIG. 5 includes forming a plurality of holes in first fluid plate and/or second fluid plate (504). Any of a variety of manufacturing techniques may be used to form the plurality of holes including, but not limited to, subtractive manufacturing from a substrate, additive manufacturing to form the fluid plate with the plurality of holes, and the like. In some examples, forming the plurality of holes further including machining the plurality of holes 210 in fluid plate 202 between the plurality of fluid channels 208 and outer surface 206B. In some examples, the plurality of holes 210 are machined with an axis formed at an angle with a plane of outer surface 206B that is less than about 90 degrees.

The method of FIG. 5 includes positioning one or more seals 218A on inner surface of first fluid plate and/or inner surface of second fluid plate (506). In examples in which fluid plates include a plurality of seal channels 220, positioning one or more seals 218A may include positioning one or more seals 218A within the plurality of seal channels 220.

The method of FIG. 5 includes mating an inner surface of first fluid plate 302A and an inner surface of second fluid plate 302B (508). At least one of first or second fluid plates 302 includes a plurality of channels 304 configured to direct pressurized fluid to the plurality of holes 306. As a result of mating the inner surfaces, first and second fluid plates 302 form a fluid passage 308 configured to receive pressurized fluid, such as from inlet 312. The method of FIG. 5 includes coupling together first fluid plate 302A and second fluid plate 302B to form fluid plate assembly 300 (510). For example, bolt 310 may be extended through both of first and second fluid plates 302A and 302B and fastened, such that seals 316 seal fluid passage 308 between inlet 312 and the plurality of holes 306 and outlet 314.

The method of FIG. 5 includes coupling fluid plate assembly 138 to housing 102 of a rotary machine, such as electric machine 100 (512). For example, fluid plate assembly 138 may be bolted to housing 102, such that fluid plate assembly 138 may provide support to housing 102.

Various examples have been described. These and other examples are within the scope of the following claims.

What is claimed is:

1. A fluid plate assembly, comprising:
   a plurality of fluid plates coupled together to form a fluid passage, wherein at least one fluid plate of the plurality of fluid plates comprises:
      a plurality of holes configured to spray pressurized fluid on at least a portion of one or more components of a rotary machine; and
      one or more fluid channels configured to direct the pressurized fluid to the plurality of holes; and
   one or more seals between the plurality of fluid plates,
   wherein a first portion of the plurality of holes is configured to deliver the pressurized fluid in a first spray distribution, and
   wherein a second portion of the plurality of holes is configured to deliver the pressurized fluid in a second spray distribution, different from the first spray distribution.

2. The fluid plate assembly of claim 1, wherein the one or more fluid channels are interconnected to form a continuous fluid passage.

3. The fluid plate assembly of claim 1, wherein at least one fluid plate of the plurality of fluid plates comprises an inlet fluidically coupled to the fluid passage and configured to receive the pressurized fluid.

4. The fluid plate assembly of claim 1, wherein at least some holes of the plurality of holes form an axis at an angle with a plane of the at least one fluid plate that is less than about 90 degrees.

5. The fluid plate assembly of claim 1, wherein the plurality of fluid plates comprises:
   a first fluid plate having an outer surface configured to face a first direction and spray pressurized fluid from a first plurality of holes to a first set of components; and
   a second fluid plate having an outer surface configured to face a second direction, opposite the first direction, and spray pressurized fluid from a second plurality of holes to a second set of components.

6. A rotary machine, comprising:
   a housing;
   one or more components encased in the housing; and
   one or more fluid plate assemblies at least partially encased in the housing,
   wherein each fluid plate assembly includes a plurality of fluid plates coupled together to form a fluid passage, and
   wherein at least one fluid plate of the plurality of fluid plates comprises:
      a plurality of holes configured to spray pressurized fluid on at least a portion of the one or more components; and
      one or more fluid channels configured to direct the pressurized fluid to the plurality of holes, and
   wherein a first portion of the plurality of holes is configured to deliver the pressurized fluid in a first spray distribution, and
   wherein a second portion of the plurality of holes is configured to deliver the pressurized fluid in a second spray distribution, different from the first spray distribution.

7. The rotary machine of claim 6, wherein each fluid plate assembly includes one or more seals between the plurality of fluid plates.

8. The rotary machine of claim 6, wherein the rotary machine comprises at least one of an electrical propulsion unit (EPU), an electric motor, an electric generator, or a gas turbine engine.

9. The rotary machine of claim 6, wherein the plurality of fluid plates of at least one fluid plate assembly of the plurality of fluid plate assemblies comprises:
   a forward fluid plate configured to face a forward direction and spray pressurized fluid on a forward set of components; and
   an aft fluid plate configured to face an aft direction, opposite the forward direction, and spray pressurized fluid on an aft set of components.

10. The rotary machine of claim 6, wherein the one or more fluid plate assemblies comprise:
- a forward fluid plate assembly defining a forward cavity of the housing and configured to spray pressurized fluid on a forward set of components in the forward cavity; and
- an aft fluid plate assembly defining an aft cavity of the housing and configured to spray pressurized fluid on an aft set of components in the aft cavity.

11. The rotary machine of claim 10,
wherein the forward and aft fluid plates define an intermediate cavity between the forward and aft cavities, and
wherein at least one of the forward and aft fluid plates is configured to spray pressurized fluid on a third set of components in the intermediate cavity.

12. The rotary machine of claim 11,
wherein the rotary machine comprises an EPU,
wherein the forward cavity comprises a propulsion cavity configured to house one or more components of a propulsion system,
wherein the intermediate cavity comprises a stator cavity configured to house a stator, and
wherein the aft cavity comprises an accessory cavity configured to house one or more components of an accessory system.

13. A method for forming a fluid plate assembly, comprising:
- mating an inner surface of a first fluid plate and an inner surface of a second fluid plate, wherein at least one of the inner surfaces of the first or second fluid plates includes one or more seals, wherein at least one of the first or second fluid plates includes a plurality of holes configured to spray pressurized fluid, wherein at least one of the first or second fluid plates includes one or more fluid channels configured to direct the pressurized fluid to the plurality of holes, wherein a first portion of the plurality of holes is configured to deliver the pressurized fluid in a first spray distribution, and wherein a second portion of the plurality of holes is configured to deliver the pressurized fluid in a second spray distribution, different from the first spray distribution; and
- coupling together the first and second fluid plates, wherein the one or more fluid channels are configured form a fluid passage configured to receive the pressurized fluid.

14. The method of claim 13, further comprising forming the one or more fluid channels and the plurality of holes in the at least one of the first or second fluid plates.

15. The method of claim 14, wherein forming the one or more fluid channels and the plurality of holes further comprises machining the one or more fluid channels and the plurality of holes in the inner surface of the first or second fluid plates.

16. The method of claim 15, wherein the plurality of holes are machined with an axis formed at an angle with a plane of the inner surface that is less than about 90 degrees.

17. The method of claim 13, further comprising, prior to mating the inner surfaces of the first and second fluid plates:
- forming one or more seal channels in at least one fluid plate; and
- positioning one or more seals in the one or more seal channels.

18. A fluid plate assembly, comprising:
a plurality of fluid plates coupled together to form a fluid passage, wherein at least one fluid plate of the plurality of fluid plates comprises:
- a plurality of holes configured to spray pressurized fluid on at least a portion of one or more components of a rotary machine; and
- one or more fluid channels configured to direct the pressurized fluid to the plurality of holes; and one or more seals between the plurality of fluid plates,
wherein the plurality of fluid plates comprises:
- a first fluid plate having an outer surface configured to face a first direction and spray pressurized fluid from a first plurality of holes to a first set of components; and
- a second fluid plate having an outer surface configured to face a second direction, opposite the first direction, and spray pressurized fluid from a second plurality of holes to a second set of components.

19. The fluid plate assembly of claim 18,
wherein the first plurality of holes is configured to deliver the pressurized fluid in a first spray distribution, and
wherein the second plurality of holes is configured to deliver the pressurized fluid in a second spray distribution, different from the first spray distribution.

20. The fluid plate assembly of claim 19,
wherein the first plurality of holes has a first spatial distribution of holes in the outer surface of the first fluid plate, and
wherein the second plurality of holes has a second spatial distribution of holes in the outer surface of the second fluid plate.

* * * * *